US010730807B2

(12) United States Patent
Uchrin

(10) Patent No.: US 10,730,807 B2
(45) Date of Patent: Aug. 4, 2020

(54) EQUIPMENT FOR OBTAINING SOLUBLE HUMATE MATERIALS FROM MINERAL COAL

(71) Applicant: Friderika Eva Uchrin, Budakeszi (HU)

(72) Inventor: Friderika Eva Uchrin, Budakeszi (HU)

( * ) Notice: Subject to any disclaimer, the term of this patent is extended or adjusted under 35 U.S.C. 154(b) by 268 days.

(21) Appl. No.: 15/743,822

(22) PCT Filed: Jun. 9, 2016

(86) PCT No.: PCT/HU2016/000036
§ 371 (c)(1),
(2) Date: Jan. 11, 2018

(87) PCT Pub. No.: WO2017/013456
PCT Pub. Date: Jan. 26, 2017

(65) Prior Publication Data
US 2018/0208515 A1 Jul. 26, 2018

(30) Foreign Application Priority Data

Jul. 17, 2015 (HU) ...................... 1500338

(51) Int. Cl.
*C05F 11/06* (2006.01)
*C01B 13/10* (2006.01)
(Continued)

(52) U.S. Cl.
CPC .............. *C05F 11/06* (2013.01); *B02C 13/26* (2013.01); *B02C 15/08* (2013.01); *B02C 17/08* (2013.01); *B02C 19/0056* (2013.01); *B02C 19/068* (2013.01); *B02C 19/16* (2013.01); *C01B 13/10* (2013.01); *C01B 13/11* (2013.01); *C08H 6/00* (2013.01); *C08H 99/00* (2013.01)

(58) Field of Classification Search
CPC ......... B02C 13/00; B02C 13/26; B02C 15/00; B02C 15/08; B02C 17/00; B02C 17/04; B02C 17/08; B02C 19/00; B02C 19/0056; B02C 19/06; B02C 19/068; B02C 19/16; C01B 13/00; C01B 13/10; C01B 13/11; C05F 11/00; C05F 11/02; C05F 11/06; C08H 6/00; C08H 99/00
See application file for complete search history.

(56) References Cited

U.S. PATENT DOCUMENTS 4,459,149 A * 7/1984 Moran .................. C08H 99/00
44/490

FOREIGN PATENT DOCUMENTS

WO WO-2010094985 A1 * 8/2010 .............. C05F 11/02

* cited by examiner

*Primary Examiner* — Natasha E Young
(74) *Attorney, Agent, or Firm* — Olson & Cepuritis, Ltd.

(57) ABSTRACT

The invention describes an installation, which serves for obtaining humate materials from mineral coal base material, and is provided with raw material depository (1), and a suitable mixer (5) for mixing of the raw material and the reagent, and where a dryer (3) for drying the raw material is attached to the raw material depository, and through a transporter (4) a mixer (5) is attached in order to mix the mineral coal base material with the solid state alkali reagent, furthermore there is a solid alkali feeder equipment (5a) and through a transporter (6) an ozonizing chamber (9) is attached to mixer (5), where the chamber (9) has an ozone inlet hole (78) attached to the ozone generator (8), and there is a mechano-chemical activator (10) attached to the outlet hole (79) of the chamber (9).

9 Claims, 1 Drawing Sheet

(51) Int. Cl.
*C01B 13/11* (2006.01)
*C08H 99/00* (2010.01)
*B02C 13/26* (2006.01)
*B02C 15/08* (2006.01)
*B02C 17/08* (2006.01)
*B02C 19/00* (2006.01)
*B02C 19/06* (2006.01)
*B02C 19/16* (2006.01)
*C08H 7/00* (2011.01)

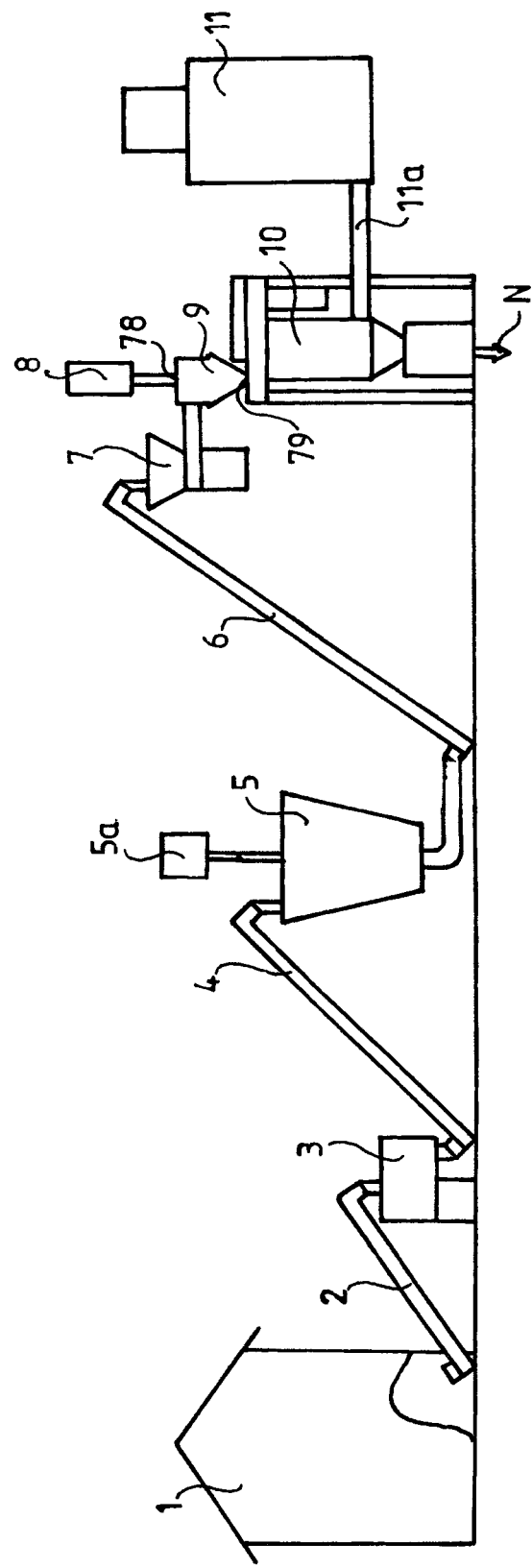

EQUIPMENT FOR OBTAINING SOLUBLE HUMATE MATERIALS FROM MINERAL COAL

CROSS-REFERENCE TO RELATED APPLICATIONS

This application is a U.S. National Stage of PCT/HU2016/000036, now WO 2017/013456, filed on Jun. 9, 2016, which claims priority of Hungarian Patent Application No. P1500338, filed on Jul. 17, 2015, each of which is incorporated herein by reference.

The invention relates to the installation for obtaining humate materials from mineral coal raw material, which is provided with a raw material depository and a mixer equipment suitable for the mixing the raw material with the reagent.

Water-soluble, high-molecular poliphenolic compounds, so called humic acids and their salts, humates can be recovered from natural insoluble humic compounds. The humates have significant commercial value, because they have several field of application. The quality of natural based humates can be measured by the water-soluble fraction contained therein. The water solubility of humates depends on the size of the humate-polymer-molecules and on the groups in the molecules containing oxygen, first of all phenolic —OH and acidic —COOH groups.

From among mineral coals, brown coal comprises 30-90 wt % of humic acids, turf 30-70 wt %, oil shale and sapropel less than 40 wt % of the same. Further chemical components in brown coal include, among others, amorphous carbon, bitumens, inorganic substances (ash), while in the case of turf, cellulosic compounds, lipids and inorganic materials.

Humic compounds are widely used, mainly in the agriculture and in environment protection. Humic compounds can be exploited in the production of humate based compositions used in plant cultivation, in animal husbandry as biological active ingredient, in the oil- and gas industry, in the environment protection for recultivation of soil, and in the rehabilitation of areas and waters contaminated with heavy metals.

The properties of humic acids are basically dependent on two parameters; the size of the polymeric molecule and the presence of oxygen-containing phenolic- and acidic groups in the molecule. For example, high molecule humic acids are not able to penetrate through the membranes of the vegetal cells, so they directly cannot influence the development and growth of plants. For activation, their macromolecules must be broken to a size below 10 000 Da. Increasing the amount of oxygen-containing groups will result in hydrophilization of the polymer and in enhancing its water-solubility.

Various chemical substances can be used to the degradation of insoluble humic compounds. In the gigantic molecule of humin, polyphenol parts of humic acids are linked to the other components via polysaccharides, lipids and "carbon-oxygen-carbon" (—C—O—C—) etheric bonds. These bonds are broken through hydrolysis in alkaline, acidic, oxidative and reducing media. Therefore, in various methods for producing humate preparations, alkali treatment is applied both for the depolymerization of humic compound molecules and for the production of easily soluble humic salt compounds—humates.

If humic acids in the natural raw material are composed of extremely large polymer molecules, "carbon-carbon" (—C—C— and —C≡C—) bonds must be "destructed" within the humic acid. Alkaline or acidic hydrolysis of such bonds is practically impossible; therefore application of oxidative hydrolysis is necessary.

In the presence of an oxidative agent not only depolymerization reactions take place, but oxidation of the polymer molecules as well, without decomposition of the polymer chains. In such cases, oxygen-containing—phenolic, ketone (=C=O), acidic groups appear in the polymer. The change in the composition of the humate macromolecule has significant effect on its properties, namely improves the solubility. The number of adjacent oxygen-containing groups (e.g. phenolic groups) located on the aromatic ring will define the principal characteristics of humates, their ability to form chelates.

Oxidation of coals containing humic compounds (by oxygen present in the air at a temperature of 100-300° C., for a time period of 5-600 minutes) is used to produce humic acids. Humic acids produced by this method are insoluble in water; therefore their application is rather limited. Soluble humic acids can be obtained by treating humic-containing starting material with alkaline or aqueous ammonia solution. Because of the low soluble humic acid content of coal (up to 10% in the prevalent leonardit type coal), the yield of soluble humic acids is limited also in this case. Treatment with aqueous ammonia solution at 100-300° C. (Dekker et al. U.S. Pat. No. 5,004,831 (1991) is associated with the use of autoclave equipment, but only a portion of the soluble humic acids present in base coal can be recovered this way.

Increase of the yield can be ensured by oxidation a part of insoluble, floating humic acids with oxygen present in the air, and then humic acid can be extracted by aqueous alkali solution. [Calemma, et. al. U.S. Pat. No. 5,248,814, 1993). Combination of the oxidation process with the alkali treatment permits the increase of obtaining dissolved acid by 70%—compared to the mass of humic acids present in coal. (Lebo, Jr, et al. U.S. Pat. No. 5,688,999, 1997). In the course of up-to-date processes, the base material containing humic substances will be milled and mixed with aqueous alkali solution in order to perform the hydrolysis of humic compounds at a pH value of 6.5-8.0 (Shulgin et al. U.S. Pat. No. 7,204,660, 2007).

The purpose of mechanical disintegration is to speed up the reaction between humic compounds and the liquid and solid reagents.

Known is also a method to produce humic compositions by the treatment of turf with strong acid or alkali (Chemistry of solid fuels, 1993, no. 1). In this case the turf/lye ratio is 1:0.5-1:1 (50-100 wt %), pH=10-12. The milling of turf in a gravitation ball-mill for a time period of 360 minutes (acceleration of the balls 10 m/s$^2$) doubles the yield of humic compounds. (T. J. Kasinszkaja, A. P. Gavrilcsik, L. P. Kalilec: Change in the chemical composition of turf in the course of dispergation, Solid Fuel Chemistry, 1997, no. 6, pages 14-24).

The above-mentioned methods have a deficiency, namely the product is highly alkaline that prevents its agricultural application in concentrated form; additional disadvantages are the high concentration of high molecule humic fractions in the composition, as well as the long duration of treatment (120-160 minutes).

According to the process as of patent no. RU 2104988, super-finely disintegrated coal mixed with chemical additives is used. The base mixture is preconditioned and the moisture content is adjusted to 6-12 wt %; as chemical additives dry alkali metal hydroxides and/or urea are used; the proportion between coal and hydroxides is held at a level of 1: 0.20-0.35.

Disadvantage of this method: the production of water soluble compounds requires the use of alkali and solid compounds. The yield of water-soluble fraction can be raised by increasing the quantity of alkali and by depolymerization of the high molecular fraction of humic compounds. However, by this method it is impossible to increase the number of groups containing oxygen.

Therefore the patent HU 228038 describes a dry process for obtaining humate materials from brown coal, where the mixture of brown coal and alkali is subject to mechano-chemical treatment, the chemical bonds of humin macromolecules are decomposed, the number of groups containing oxygen is enhanced, and water-soluble humate compounds are obtained in such a manner that, in order to increase the concentration of humate materials in the preparation, to enhance the biological activity of the product and to reduce the consumption of chemicals, the mechano-chemical treatment of the mixture of brown coal and alkali is performed in the presence of a gas-form oxidative agent, namely ozone. Most likely the process is performed under laboratory circumstances, because the application doesn't describe any industrial equipment for the effective realization of the process.

Therefore the purpose of the invention is to work out suitable equipment in industrial scale for the dry process capable of increasing the concentration of humate compounds, enhancing the solubility of the preparation produced, reducing the consumption of chemicals and diminishing the costs of production, as well as preventing environmental pollution due to a completely closed technological system; where the processing of the humic-containing raw material is performed in the presence of a gas-form substance—ozone—in order to decompose the structure of humate compounds, and in the mixture of brown coal and alkali—where the ozone ensures the procedure of oxidative polymerization, forming of humate materials, and increased number of groups containing oxygen in the humates, meanwhile environmentally dangerous/harmful materials do not get out from the equipment.

Our purposes are realized by working out such an equipment for obtaining humate materials from mineral coal base material, which includes a raw material depository and a mixer suitable for mixing the base material with the reagent, furthermore a dryer, sealed from the environment, for drying the base material, and where the mixer is provided with suitable, hermetically sealed feeder for the solid alkali reagent, and where an alkali feeder and an ozone-chamber activator is attached hermetically to the mixer, and where the ozone chamber has an inlet opening attached to the ozone generator, sealed from the environment, and where mechano-chemical reactor is attached to the outlet opening, sealed from the environment.

Preferably the mechano-chemical activator is a centrifugal vibration ball-mill.

The ball-mill is provided with stainless steel balls, diameter 15-25 mm, quantity 25-40% of reactor volume.

The performance of the ball-mill is 60-180 m/s$^2$, expressed by the acceleration of the balls.

In other form, the mechano-chemical activator is preferably a suitable designed paddle-wheel mill, with a performance, expressed by the rotation speed of the impeller blades, of 10-120 m/s.

In other beneficial form, the mechano-chemical activator is a pneumatic jet-stream mill, with a performance of 10-120 m/sec, expressed by the speed of air-flow.

Preferably the equipment is provided with an ozone generator, suitable to produce ozone mixed with air at a partial pressure of 0-0.1 MPa, and at a temperature of 0 to 60 C°.

Further on the invention is described in details with reference to the attached drawing.

FIG. 1 illustrates the equipment as of the invention. As raw material, mineral coal, preferably peat or leonardit type brown coal is used. Leonardit contains humic-compounds in 65 wt %, other substances (mostly inorganic oxides): ash—30 wt %, carbon—15 wt %. Other components in wt %: nitrogen—0.18, phosphorus (in $P_2O_5$ equivalent)—0.05, —potassium (in $K_2O$ equivalent)—0.06, magnesium—0.37, iron—0.67, manganese—0.01.

Leonardit is disintegrated to a particle size below 3 mm and conducted from 1 raw material depository by 2 conveyor to 3 dryer, sealed from the environment, where it is conditioned to a moisture content of 8-16 wt %, while the moisture content is measured continuously by an adequate instrument. Also in the further parts of the equipment, the moisture content of the material will be held on the value of 8-16 wt % established in 3 dryer. In this description, the terms: sealed from the environment, closed equipment, etc. shall have the meaning that, air from the environment cannot penetrate in unhindered and/or in an uncontrolled manner into the equipment or into the attaching tubes, that means the entire technological line of the various connected equipment can be considered a closed system.

The low humidity content makes possible to enhance the efficiency of further reactions on the one hand, and to prevent sticking of the raw material to the wall of different parts in the equipment on the other hand. The well dried material is transported from 3 dryer by means of hermetically attached, 4 conveyor, sealed from the environment, into the 5 mixer (e.g. Zucchetti, Italy), where it is mixed with the reagent, preferably with solid alkali. As an alkali, metal-hydroxides with a particle size of below 3 mm, and with a main component content of minimum 90% are used, mainly NaOH, KOH, or metal-carbonates—mainly potassium or sodium carbonate; these are transported from 5a alkali-feeder, hermetically sealed from the atmosphere, into 5 mixer. Application of solid state alkali prevents escaping of liquid contaminating materials, e.g. caustic lye solutions, and eventually solved hazardous materials therein, into the environment. The 5a alkali-feeder and 5 mixer are also attached to each other by hermetically sealed conducts, in order to prevent both the raw material and the strongly hygroscopic solid alkali from absorbing humidity from the ambience after drying. In addition, solid alkali may form carbonates with the $CO_2$ content of the atmosphere, which are inadequate for application as reagent.

The mixture is transported from 5 mixer by 6 conveyor, closed and sealed from the environment, into 7 feeder, which sends the solid mixture with controlled flux into 9 ozone-chamber. The 9 ozone-chamber has a 78 inlet hole attached to 8 ozone generator, while its 79 outlet hole is attached to the 10 mechano-chemical activator. Ozone can be produced by 8 ozone-generator, for example type Ionic Zone Ozone Generators (Ionic Zone LLC, Las Vegas, USA). 7 feeder, 9 ozone-chamber and 10 mechano-chemical reactor form a sealed unit as well.

8 ozone-generator produces an ozone containing gas-mixture with the air, with a temperature of 0-60° C., and a partial pressure of 0-0.1 MPa, having defined relative humidity, and will send the mixture into 9 ozonising chamber, and after that into 10 mechano-chemical activator.

We observed that, the lower is the moisture content of the air introduced to the 8 ozone-generator, the higher will be the quantity of ozone produced. Therefore, dried air with lowest possible humidity is conducted from the atmosphere into 8 ozone-generator—not only in order to decrease the humidity, but also in order to increase the yield of ozone-generation.

Preferably, the ozone content of the gas mixture is between 0.1-2.0%.

When the mineral coal-alkali solid mixture meats the air-ozone mixture in the 9 ozonizing chamber, and then in 10 mechano-chemical activator, under strong mechanical action intensive oxidation of humic acid and neutralization of oxidized humic acid by alkali take place and formation of humates start. The installation as of the invention is provided with 11 dust filtering unit, which is attached to the 11 dust filtering unit through 11a sealed tube, in order to prevent leakage of powder-form product particles into the environment, and entering of moisture into the 10 activator respectively.

The composition of the ozone-air gas mixture is determined by the amount of alkali needed to neutralize humic acid and to catalyze the alkaline depolymerization of the humic compound, and ranges from 5 to 25 wt %. The amount of ozone is determined based on the number of oxygen-containing groups needed to increase the solubility of humate, and ranges from 0.1- to 3% by weight, based on the weight of mineral coal, e.g. leonardit used in the process. Alkali content below 5% is not sufficient for increasing the solubility of coal; on the other hand alkali content over 25% will enhance the solubility of coal, but will significantly raise the cost of the process and increase the pH of the coal product solutions to 9-10, which does not permit its conventional application. Ozone introduced in an amount below 0.1% does not increase the solubility of the product, while ozone used in an amount over 3% oxidizes humic acids and leads to the formation of oxidation-resistant, low molecular weight carboxylic- and dicarboxylic acids, decreasing thereby the yield of humic acids.

According to the invention, the 10 mechano-chemical activator, used for the mechanical and chemical transformation of the powder-form material treated with alkali and reacted with ozone, is expediently a centrifugal-vibration ball-mill, where the acceleration of the balls must reach the optimal value of 30 m/s$^2$. If the acceleration of the balls is lower than the above value, significantly will decrease the velocity of the reaction and the performance of the activator. This effect can also be reached by centrifugal-elliptic mills, preferably with planetary-vibration ball-mills, for example in those produced by Novic, Novosibirsk, Russia. Preferably 25-40% of the volume of the ball-mill is filled up with balls made of wear-resistant steel or medical metal, having a diameter of 15-25 mm. The performance of the ball-mill, expressed with the acceleration of the balls, is minimum 30 m/s$^2$.

For the treatment of the product in ozone-containing medium, equipment with less intensity, like gravitational ball mills, or disintegrator-type grinding machines, jet and vortex mills are also applicable instead of centrifugal ball mills, which can be used in the following operating modes:
- in paddle-wheel (roller) mill with the rate of impeller blades rotating at a speed from 10 to 120 m/s, for a time period of 0.2-2.0 minutes,
- in pneumatic and jet stream mill with a flow rate of 10 to 120 m/s, for a time period of 0.2-2.0 minutes.

The lower threshold value of effect-intensity (ball acceleration of 30 m/s$^2$) can be determined by the threshold value of the intensity of mechanical effect required for the progress of the mechanical and chemical process (Avvakumov J. G.: Mechanical Methods of Activation of Chemical Processes. Novosibirsk, Nauka, Siberian branch. 1986, page 303).

The upper threshold value of effect intensity is 60 m/s$^2$, which can be determined by the beginning of the degradation process of humic compounds, as well as by their transformation to amorphous carbon structure.

At the end of the mechanical and chemical treatment, we receive powder form product, advancing from 10 activator in the direction of arrow N, into the tank for finished product. That means, the equipment as of invention forms a closed technological line between 3 dryer and the finished product tank, where only 8 ozone-generator employs ambient air in determined quantity and humidity content.

The product can directly be used in farm breeding as fertility- and growth stimulating feed-supplement for the cattle-, pig- and poultry population. Furthermore, the composition can be used in the plant cultivation too, as growth stimulating agent, through seed-dressing, or by adding it to the irrigation water in order to promote sprouting, the growth of the parts over the soil surface, increase of root development, and, in generally, in order to enhance the fertility of plants. Positive advantages of the powder-form composition compared to the liquid preparations: the ease of transport and storage. In case of necessity, the powder-form product can be extracted; in this case we can get preparations with soluble materials in higher concentrations and high quality products with better performance.

The operation of the installation as of the invention is illustrated by the following example:

Brown coal type leonardit raw material (place of occurrence: Dudar, Hungary) having a moisture content of 15 wt % was previously disintegrated to a granulation below 1 mm in the crasher, then dried in the dryer 3. Then coal was mixed in mixer 5 with "pure" or "technical purity" sodium hydroxide (KOH or NaOH) coming from 5a feeder, then treated in centrifugal vibration ball mill, (type CEM 20, manufacturer: Novic, Novosibirsk, Russia) as 10 activator, with an acceleration of the balls of 30 m/s$^2$, for a time period of 1 minute, simultaneously exposed to the effect of ozone-air mixture entering from 8 generator. The resulted material was fine powder-form, soluble preparation with rich humate content.

Thus, the advantages of the equipment as of the invention comparing to the other equipment representing up-to-date technology, include the implementation in industrial scale of the dry process in a closed technological system, suitable for increasing the concentration of humate compounds, enhancing the solubility of the preparation, reducing the consumption of chemicals and the cost of production, and where the processing of humic-containing raw material is performed in the presence of a gas-form substance—ozone—which disintegrates the structure of humic compounds, in a mixture of brown coal and alkali, where the ozone ensures the process of oxidative polymerization, forming of humates, and the enhanced presence of oxygen-containing groups in these humates respectively, meanwhile environmentally dangerous/harmful materials do not get out from the equipment.

The invention claimed is:

1. Equipment for recovering humate substances from mineral coal raw material, provided with a depository (1) for the raw material and a closed mixer (5), suitable for mixing the raw material and a solid state alkali reagent wherein attached to the raw material depository (1) is a conveyor (2) to a dryer (3), sealed from the environment and suitable for producing dried mineral coal raw material, and the dryer (3) attached, through a transporter (4), sealed from the environment, to the mixer (5), suitable for mixing of the dried mineral coal raw material with the solid state alkali reagent, and where a closed solid state alkali reagent feeder (5a) is attached to the mixer (5), and through another transporter (6) and a feeder (7), sealed from the environment, additionally a closed ozonizing chamber (9) is attached to the feeder (7), where the ozonizing chamber has an ozone inlet hole (78) attached to an ozone generator (8), and an outlet hole (79) of the ozonizing chamber is attached to a mechano-chemical reactor (10), sealed from the environment.

2. Equipment as of claim 1 wherein the mechano-chemical reactor (10) is a centrifugal vibration ball mill.

3. Equipment as of claim 2 wherein the ball mill is filled up with wear resistant steel balls of diameter 15-25 mm to 25-40% of reactor volume.

4. Equipment as of claim 3 wherein the ball mill can accelerate balls to a minimum of 30 m/s$^2$.

5. Equipment as of claim 1 wherein the mechano-chemical reactor (10) is a planetary-vibration ball mill capable of at least 30 m/s$^2$ acceleration of the balls.

6. Equipment as of claim 1 wherein the mechano-chemical reactor (10) is an impeller mill.

7. Equipment as of claim 1 wherein the mechano-chemical reactor (10) is a pneumatic jet stream mill having a pneumatic flow rate of 10 to 120 m/s.

8. Equipment as of claim 1 wherein the ozone generator (8) can produce an air-ozone mixture having temperature of 0-60° C., and an ozone partial pressure of 0-0.1 MPa.

9. Equipment as of claim 1 wherein the mechano-chemical reactor (10) is provided with a dust filter unit (11).

\* \* \* \* \*